US009571955B1

United States Patent
Mohdi et al.

(10) Patent No.: US 9,571,955 B1
(45) Date of Patent: Feb. 14, 2017

(54) SYSTEMS AND METHODS TO TRANSFER OPERATIONS BETWEEN MOBILE AND PORTABLE DEVICES

(71) Applicant: MOTOROLA SOLUTIONS, INC., Schaumburg, IL (US)

(72) Inventors: Intan Mazlina Mohd Mohdi, Penang (MY); Wei Lun Oo, Penang (MY); Mohammad Athari Ismail, Penang (MY); Wei Jian Lee, Melaka (MY); Jia Wen Yong, Pulau Pinang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/807,650

(22) Filed: Jul. 23, 2015

(51) Int. Cl.
*H04W 4/00* (2009.01)
*H04W 8/00* (2009.01)
*H04W 76/02* (2009.01)

(52) U.S. Cl.
CPC ............ *H04W 4/008* (2013.01); *H04W 8/005* (2013.01); *H04W 76/023* (2013.01)

(58) Field of Classification Search
CPC .... H04W 4/008; H04W 76/023; H04W 8/005; H04W 4/04; H04B 1/082; H04B 1/3822; H04M 1/6083
See application file for complete search history.

(56) References Cited

U.S. PATENT DOCUMENTS 8,971,850 B2     3/2015   Klein et al.
9,183,370 B2 * 11/2015   Merchant ................ G06F 21/34
2009/0300685 A1 * 12/2009   Easter ..................... H04N 7/147
                                                                          725/62
2012/0282908 A1 * 11/2012   Nicolini .................. H04W 4/04
                                                                             455/418
2014/0073308 A1 * 3/2014   Kim ...................... H04W 4/046
                                                                             455/418
2014/0142783 A1 * 5/2014   Grimm .................. H04W 4/008
                                                                               701/2
2014/0171123 A1    6/2014   Madau et al.
2014/0184171 A1 * 7/2014   Lee ....................... H02J 7/0055
                                                                             320/138
2014/0248863 A1    9/2014   Golsch
(Continued)

OTHER PUBLICATIONS

Oo, Wei Lun, "Method and Apparatus for Power Transfer for a Portable Electronic Device," U.S. Appl. No. 14/631,030, filed Feb. 25, 2015 by Motorola Solutions, Inc. (30 pages).
(Continued)

*Primary Examiner* — Andrew Wendell
(74) *Attorney, Agent, or Firm* — Michael Best & Friedrich LLP

(57) ABSTRACT

A system and method to detect the presence of a portable communication device in a vehicle. In one exemplary embodiment, the method includes detecting, with an electronic processor of the portable communication device, that the portable communication device is receiving wireless power from a wireless charger located in the vehicle. The method further includes establishing a short-range wireless connection between the portable communication device and a vehicle control head. The method further includes sending a message from the portable communication device to the vehicle control head to transfer control of the portable communication device to the vehicle control head.

18 Claims, 5 Drawing Sheets

(56) References Cited

U.S. PATENT DOCUMENTS

| | | | |
|---|---|---|---|
| 2015/0116121 A1* | 4/2015 | Hur | G08B 21/24 |
| | | | 340/686.6 |
| 2015/0127215 A1* | 5/2015 | Chatterjee | H04W 4/001 |
| | | | 701/36 |
| 2015/0149042 A1* | 5/2015 | Cooper | B60R 16/037 |
| | | | 701/48 |
| 2015/0357860 A1* | 12/2015 | Wippler | H02J 7/025 |
| | | | 320/108 |
| 2016/0070287 A1* | 3/2016 | Chin | G05F 1/66 |
| | | | 700/297 |
| 2016/0087485 A1* | 3/2016 | Maeda | H02J 7/025 |
| | | | 455/573 |

OTHER PUBLICATIONS

PCT/US2016/042114 International Search Report and Written Opinion of the International Searching Authority dated Sep. 28, 2016 (10 pages).

* cited by examiner

US 9,571,955 B1

SYSTEMS AND METHODS TO TRANSFER OPERATIONS BETWEEN MOBILE AND PORTABLE DEVICES

BACKGROUND OF THE INVENTION

Public safety and emergency personnel use portable communication devices (e.g., two-way radios, cellular telephones, and tablet computers) as well as devices with similar functionality that are mounted in public safety vehicles. Such vehicle-mounted devices are often referred to as "mobile devices." Multiple mobile devices may be controlled through a vehicle control head (e.g., a vehicle computer having or coupled to a display and other user interface components). The vehicle control head provides one shared mechanism to control a large array of communications and other electronic equipment on the vehicle. The vehicle control head and the portable communication devices are equipped with short-range wireless communications (e.g., Bluetooth) to enable the vehicle control head to wirelessly communication with and, ultimately, control and operate the portable communications devices. However, current short-range wireless communication technologies cannot differentiate between a portable communication device that is in the vehicle, and one that is merely near the vehicle. This can lead to the vehicle control head taking control of the portable communication device when the user of the device does not have physical access to the vehicle control head. Manual transfer of control from the portable communication device to the vehicle control head is cumbersome because public safety personnel may frequently and/or quickly enter and exit a vehicle during mission critical operations, and may not have time to safely manually transfer control.

Accordingly, there is a need for systems and methods to transfer operations between mobile and portable devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
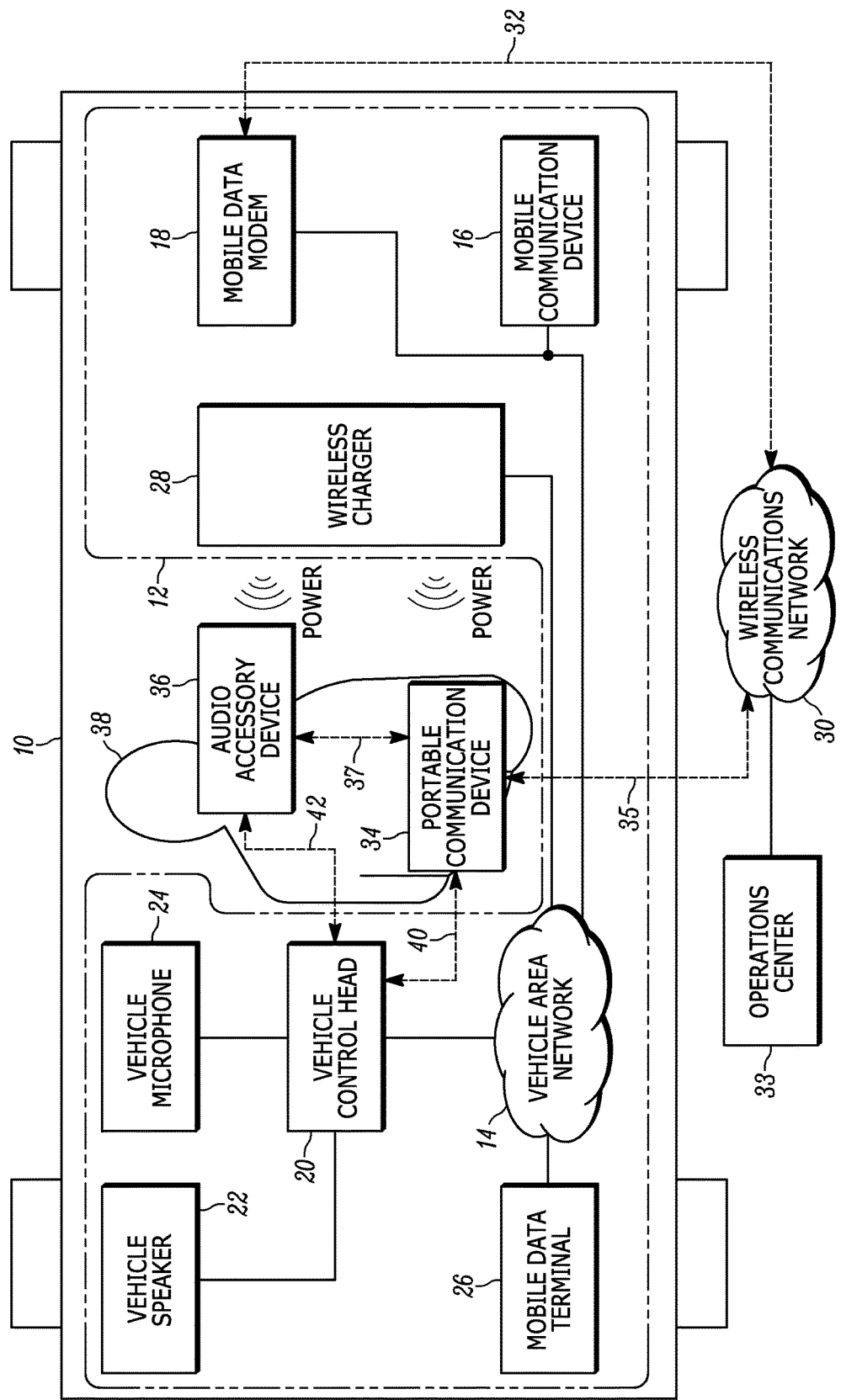
FIG. 1 is a block diagram of a vehicle having a communications system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Embodiments of the invention include a method for detecting the presence of a portable communication device in a vehicle. In one exemplary embodiment, the method includes detecting, with an electronic processor of the portable communication device, that the portable communication device is receiving wireless power from a wireless charger located in the vehicle. The method further includes establishing a short-range wireless connection between the portable communication device and a vehicle control head. The method further includes sending a message from the portable communication device to the vehicle control head to transfer control of the portable communication device to the vehicle control head. Some embodiments include a system for detecting the presence of a portable communication device in a vehicle. In one such embodiment, the system includes a vehicle control head located in the vehicle, a wireless charger located in the vehicle, and a portable communication device. The portable communication device includes a transceiver and an electronic processor. The electronic processor is configured to detect that the portable communication device is receiving wireless power from the wireless charger. The electronic processor is further configured to establish a short-range wireless connection with the vehicle control head via the transceiver. The electronic processor is further configured to send a message to the vehicle control head to transfer control of the portable communication device to the vehicle control head.

FIG. 1 schematically illustrates a vehicle 10. In some embodiments, vehicle 10 is a public safety vehicle, for example a police squad car or a fire engine. The vehicle 10 includes a communications system 12. Components of the communications system 12 are configured to be mounted in and on the vehicle 10. The communications system 12 includes a vehicle area network 14, and a mobile communication device 16. In one exemplary implementation, the mobile communication device 16 is a mobile two-way radio. In the illustrated embodiment, the mobile communication device 16 is coupled to the vehicle area network 14 with a wired connection. In some embodiments, the mobile communication device 16 includes components to provide voice, video, and data communications.

The communication system 12 also includes a mobile data modem 18, a vehicle control head 20, a vehicle speaker 22, a vehicle microphone 24, a mobile data terminal 26, and a wireless charger 28. For ease of description, the embodiment of the communications system 12 illustrated in FIG. 1 includes one of each component. Alternative embodiments may include one or more of each component, or may lack one or more components.

The vehicle area network 14 electrically interconnects the mobile communication device 16, the mobile data modem 18, the vehicle control head 20, the mobile data terminal 26, and the wireless charger 28. The interconnections of the vehicle area network 14 may be wired or wireless. The vehicle area network 14 transfers network traffic (e.g., voice, video, and data) between the components of the communications system 12.

The mobile data modem 18 is coupled to the vehicle area network 14 and provides components of the communications system 12 access to networks external to the vehicle 10. External networks may include, for example, the Internet, and cellular networks (as described in detail hereinafter).

In the illustrated embodiment, the mobile data modem 18 is a long term evolution (LTE) modem configured to provide wireless data connections between the vehicle area network 14 and a wireless communications network 30 over a wireless data connection 32. In alternative embodiments, the mobile data modem 18 operates using other mobile wireless data protocols, including, for example, Time Division Multiple Access (TDMA), Code Division Multiple Access (CDMA), and Worldwide Interoperability for Microwave Access (WiMax).

The wireless communications network 30 may include one or more land-mobile radio networks, cellular networks (e.g., long term evolution (LTE), Time Division Multiple Access (TDMA), and Code Division Multiple Access (CDMA)), and other local and wide area data networks (e.g., Worldwide Interoperability for Microwave Access (WiMax)). The wireless communications network 30 may also have one or more connections to a public switched telephone network (PSTN), the Internet, or both. In the embodiment illustrated in FIG. 1, the wireless communications network 30 is controlled by an operations center 33. The operations center 33 includes one or more computer systems suitable for controlling the wireless communications network 30 and communicating with the communications system 12. It will be appreciated that the control of the wireless communications network 30 may be implemented with any alternative centralized or decentralized control mechanism. In one embodiment, the operations center 33 is a public safety dispatch center (e.g., a mission critical operations center). In alternative embodiments, the wireless communications network 30 may be an ad hoc peer-to-peer network (e.g., an ad hoc incident site network).

Like other components of the communications system 12, the vehicle control head 20 is coupled to the vehicle area network 14. The vehicle control head 20 also couples to other electronic devices using short-range wireless connections (e.g., Bluetooth). In certain embodiments, the vehicle control head 20 operates as a central user interface for communications and other equipment in the vehicle 10. As an example, the Motorola O9 Integrated Control Head for APX™ Mobile Radios includes many, though not all, of the features and functions of the vehicle control head 20 described herein. The vehicle control head 20 includes components (described hereinafter) and underlying hardware and software to control the mobile communication device 16. In certain embodiments, the vehicle control head 20 includes components necessary to control more than one communications device, for example, when multiple portable communication devices are present in vehicle 10. The vehicle control head 20 controls the communications system 12 to send and receive voice and data communications via the mobile communication device 16, the mobile data modem 18, and the wireless communications network 30.

The vehicle control head 20 receives user input provided via, for example, a keypad, a microphone, softkeys, icons, or softbuttons on a touch screen, a scroll ball, buttons, and the like. User input includes, for example, selecting a channel for voice communications, initiating a voice communication, and adjusting settings of the mobile communication device 16. The vehicle control head 20 is configured to provide output via a display such as a liquid crystal display (LCD), touch screen, and the like. Output provided on the display includes, for example, information sent from the operations center 33 and status information regarding the operation of the mobile communication device 16 (e.g., active channels).

The vehicle control head 20 is electrically coupled to the vehicle speaker 22 and the vehicle microphone 24. The vehicle speaker 22 and vehicle microphone 24 may be conventional and, as a consequence, are not described in detail herein. The vehicle control head 20 plays audio from the mobile communication device 16 via the vehicle speaker 22. The vehicle speaker 22 may be a standalone speaker, a speaker or speakers integrated into an audio system of the vehicle 10, or part of a radio speaker-microphone. Audio from the vehicle microphone 24 is provided to the mobile communication device 16 via the vehicle control head 20. The vehicle microphone 24 may be positioned within a component of the vehicle 10 (e.g., the steering wheel) or may be part of a standalone microphone such as a radio speaker-microphone.

In one embodiment, the mobile data terminal 26 is a portable computer (e.g., a laptop or tablet computer). The mobile data terminal 26 is coupled to the vehicle area network 14 and is configured to communicate with the operations center via the mobile data modem 18 and the wireless communications network 30. In one embodiment, the mobile data terminal 26 runs computer-aided dispatch software. In other embodiments, the mobile data terminal 26 runs other software including, for example, video conferencing software, and a web browser.

The communications system 12 also includes a portable communication device 34 (e.g., a portable two-way radio). The portable communication device 34 communicates wirelessly with the wireless communications network 30, for example, over the wireless link 35. The portable communication device 34 establishes a short-range wireless connection 40 with, among other devices, the vehicle control head 20. The short-range wireless connection 40 may be implemented using a wireless network protocol (e.g., a Bluetooth standard protocol.)

The communications system 12 also includes an audio accessory device 36. In one example, the audio accessory device 36 is a wireless radio speaker-microphone (WRSM), which is wirelessly coupled over a wireless control link 37 (e.g., a Bluetooth connection) to the portable communication device 34, and worn by a public safety officer 38. The audio accessory device 36 is thus used with the portable communication device 34 to provide remote control and audio functions. The audio accessory device 36 also establishes a second short-range wireless connection 42 with, among other devices, the vehicle control head 20. Like the short-range wireless connection 40, the second short-range wireless connection 42 may be implemented using a wireless network protocol (e.g., a Bluetooth standard protocol).

As described in more detail below, the portable communication device 34 and the audio accessory device 36 are electrical devices that operate on battery power. The wireless charger 28 charges portable electronic equipment, using induction coils, when that equipment is in within the inductive power transfer range of the wireless charger 28. The wireless charger 28 is positioned in the vehicle 10, for example, in a vehicle seat, so that when the public safety officer 38 is seated in the vehicle 10, the portable communication device 34, for example, worn on a belt of the public safety officer is within the inductive power transfer range of the wireless charger 28. The wireless charger 28 then wirelessly transmits power to the portable communication device 34 to recharge its battery or batteries. The batteries of the audio accessory device 36 may be similarly recharged.

One example of a wireless charger 28 is described in U.S. patent application Ser. No. 14/631,030.

Figure 2:
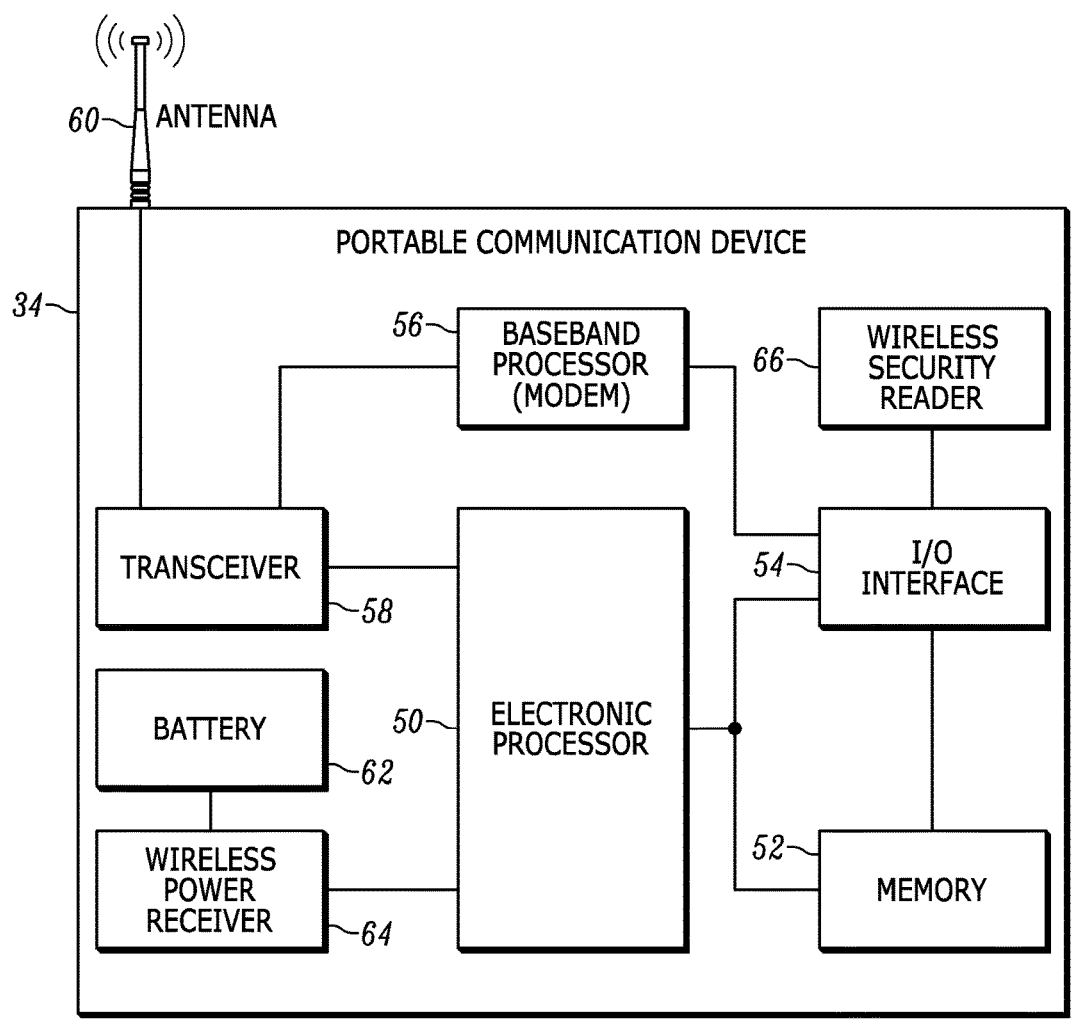
FIG. 2 is a block diagram of a portable communication device in accordance with some embodiments.

As illustrated in FIG. 2, in one embodiment the portable communication device 34 includes an electronic processor 50 (e.g., a microprocessor or another suitable programmable device), a memory 52 (e.g., a computer-readable storage medium), an input/output interface 54, a baseband processor 56 (e.g., a network modem), a transceiver 58, an antenna 60, a battery 62, a wireless power receiver 64, and a wireless security reader 66. The portable communication device 34 terminates and originates voice and data communications over the wireless communications network 30 via the transceiver 58 and the antenna 60 over the wireless link 35. The portable communication device 34 is coupled to, and may be controlled and operated by, the audio accessory device 36 over the wireless control link 37. The portable communication device 34 may also be coupled to, and controlled and operated by, the vehicle control head 20 over the short-range wireless connection 40. In a number of the embodiments described herein, the portable communication device 34 is a portable two-way radio. However, in alternative embodiments, the portable communication device 34 is a cellular telephone, a smart telephone, a smart watch, a tablet computer, a personal digital assistant (PDA), or other device that includes or is capable of being coupled to a network modem or components to enable wireless network communications (such as an amplifier, antenna, etc.) on the wireless communications network 30.

The electronic processor 50, the memory 52, the input/output interface 54, the baseband processor 56, the transceiver 58, and the wireless power receiver 64, as well as other various modules and components, are coupled by one or more control or data buses to enable communication therebetween. The memory 52 may include a program storage area (e.g., read only memory (ROM) and a data storage area (e.g., random access memory (RAM), and another non-transitory computer readable medium. The electronic processor 50 is coupled to the memory 52 and executes computer readable instructions ("software") stored in the memory 52. For example, software for performing methods as described hereinafter may be stored in the memory 52. The software may include one or more applications, program data, filters, rules, one or more program modules, and/or other executable instructions.

The input/output interface 54 operates to receive user input, to provide system output, or a combination of both. User input may be provided via, for example, a keypad, a microphone, softkeys, icons, or softbuttons on a touch screen, a scroll ball, buttons, and the like. System output may be provided via a display device such as a liquid crystal display (LCD), touch screen, and the like (not shown). The input/output interface 54 may include a graphical user interface (GUI) (e.g., generated by the electronic processor 50, from instructions and data stored in the memory 52, and presented on a touch screen) that enables a user to interact with the portable communication device 34. The baseband processor 56 is configured to encode and decode digital data sent and received by the transceiver 58 to and from the wireless communications network 30 via the antenna 60.

The battery 62 provides electrical power to the various components of the portable communication device 34 through one or more power circuits (not shown). The battery 62 is rechargeable and receives power from the wireless power receiver 64. The wireless power receiver 64 receives power transmitted from the wireless charger 28 when the portable communication device 34 is within the inductive power transmission range of the wireless charger 28. The wireless power receiver 64 sends a message indicating receipt of power to the electronic processor 50 when it receives wireless power from the wireless charger 28.

The wireless security reader 66 is a very short-range wireless receiver. The wireless security reader 66 receives data from wireless security devices (e.g., tags and keycards). Examples of a wireless security reader 66 include a near field communication (NFC) reader and a radio-frequency identification (RFID) reader. The wireless security reader 66 is configured to receive data, including authentication tokens, from wireless security devices located, for example, in the vehicle 10, and transmit that data to the electronic processor 50.

Figure 3:
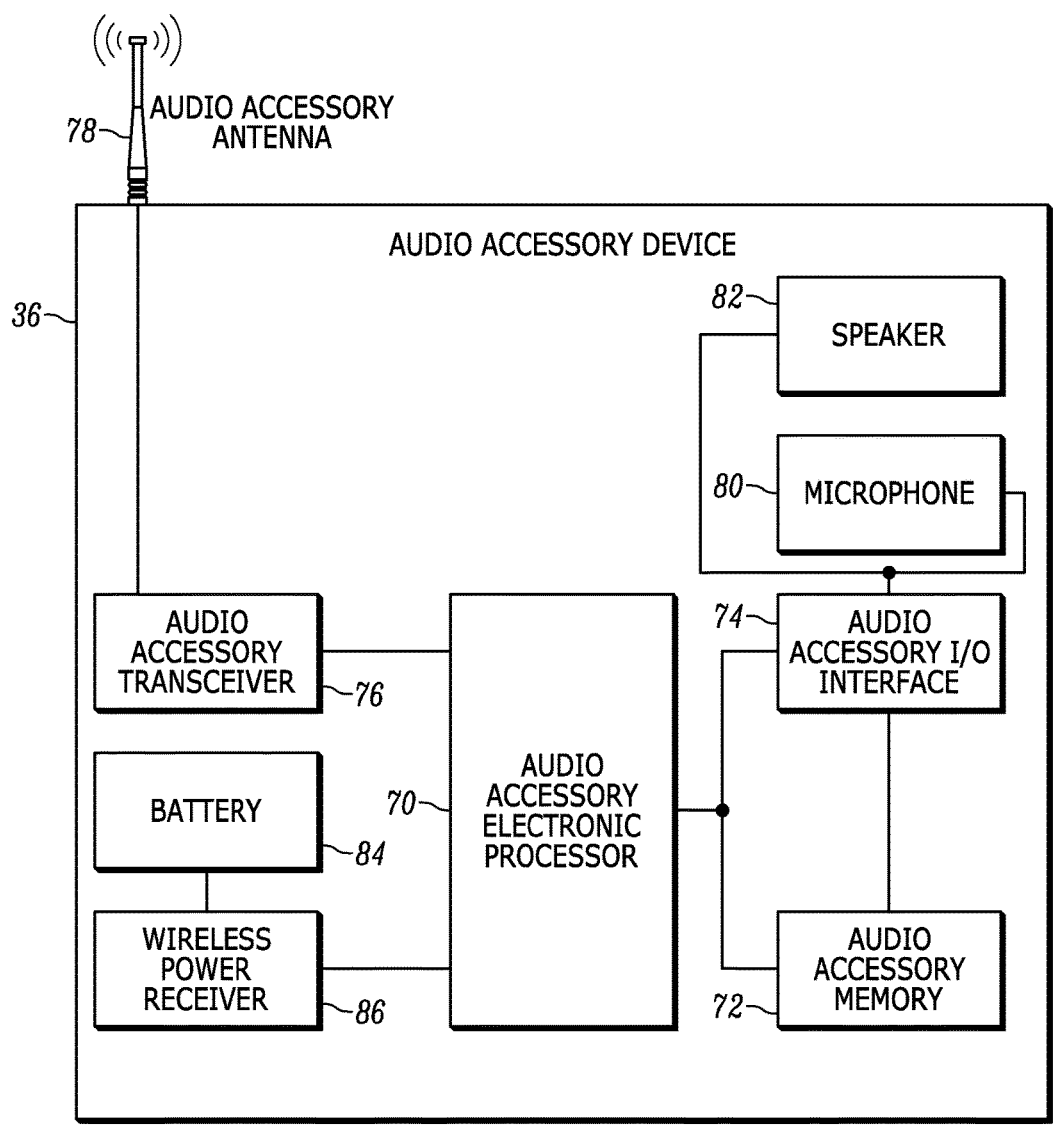
FIG. 3 is a block diagram of an audio accessory device in accordance with some embodiments.

As illustrated in FIG. 3, in one embodiment the audio accessory device 36 includes an audio accessory electronic processor 70 (e.g., a microprocessor or another suitable programmable device), an audio accessory memory 72 (e.g., a computer-readable storage medium), an audio accessory input/output interface 74, an audio accessory transceiver 76, an audio accessory antenna 78, a microphone 80, a speaker 82, a battery 84, and a wireless power receiver 86. In a number of the embodiments described herein, the audio accessory device 36 is a wireless radio speaker-microphone (WRSM). However, in alternative embodiments, the audio accessory device 36 can be another audio accessory including, for example, a wireless headset. As noted above, the audio accessory device 36 wirelessly couples to, among other things, the vehicle control head 20 and the portable communication device 34. When wirelessly coupled to the portable communication device 34, the audio accessory device 36 operates to control the operations of the portable communication device 34 to send and receive voice communications (using the microphone 80 and the speaker 82), select operational modes, select channels, and the like. When wirelessly coupled to the vehicle control head 20, the audio accessory device 36 is capable of sending and receiving voice communications (using the microphone 80 and the speaker 82) through the mobile communication device 16 via the vehicle control head 20.

The audio accessory electronic processor 70, the audio accessory memory 72, the audio accessory input/output interface 74, the audio accessory transceiver 76, and the wireless power receiver 86, as well as other modules and components, are coupled by one or more control or data buses to enable communication therebetween. The audio accessory memory 72 may include a program storage area (e.g., read only memory (ROM) and a data storage area (e.g., random access memory (RAM), and another non-transitory computer readable medium. The audio accessory electronic processor 70 is coupled to the audio accessory memory 72 and executes computer readable instructions ("software") stored in the audio accessory memory 72. For example, software for performing methods as described below may be stored in the audio accessory memory 72. The software may include one or more applications, program data, filters, rules, one or more program modules, and/or other executable instructions.

The audio accessory input/output interface 74 may be used to receive user input, to provide system output, or a combination of both. User input may be provided via, for example, a keypad, a scroll ball or wheel, buttons, and the like. System output can be provided via a display device such as a liquid crystal display (LCD), touch screen, and the like (not shown). The audio accessory input/output interface 74 may include a graphical user interface (GUI) (e.g., generated by the audio accessory electronic processor 70, from instructions and data stored in the audio accessory memory 72, and presented on a touch screen) that enables a user to interact with the audio accessory device 36.

The battery 84 provides electrical power to the various components of the audio accessory device 36 through one or more power circuits (not shown). The battery 84 is rechargeable and receives power, the wireless power receiver 86. The wireless power receiver 86 is capable of receiving power transmitted from the wireless charger 28 when the audio accessory device 36 is in proximity to the wireless charger 28.

Figure 4:
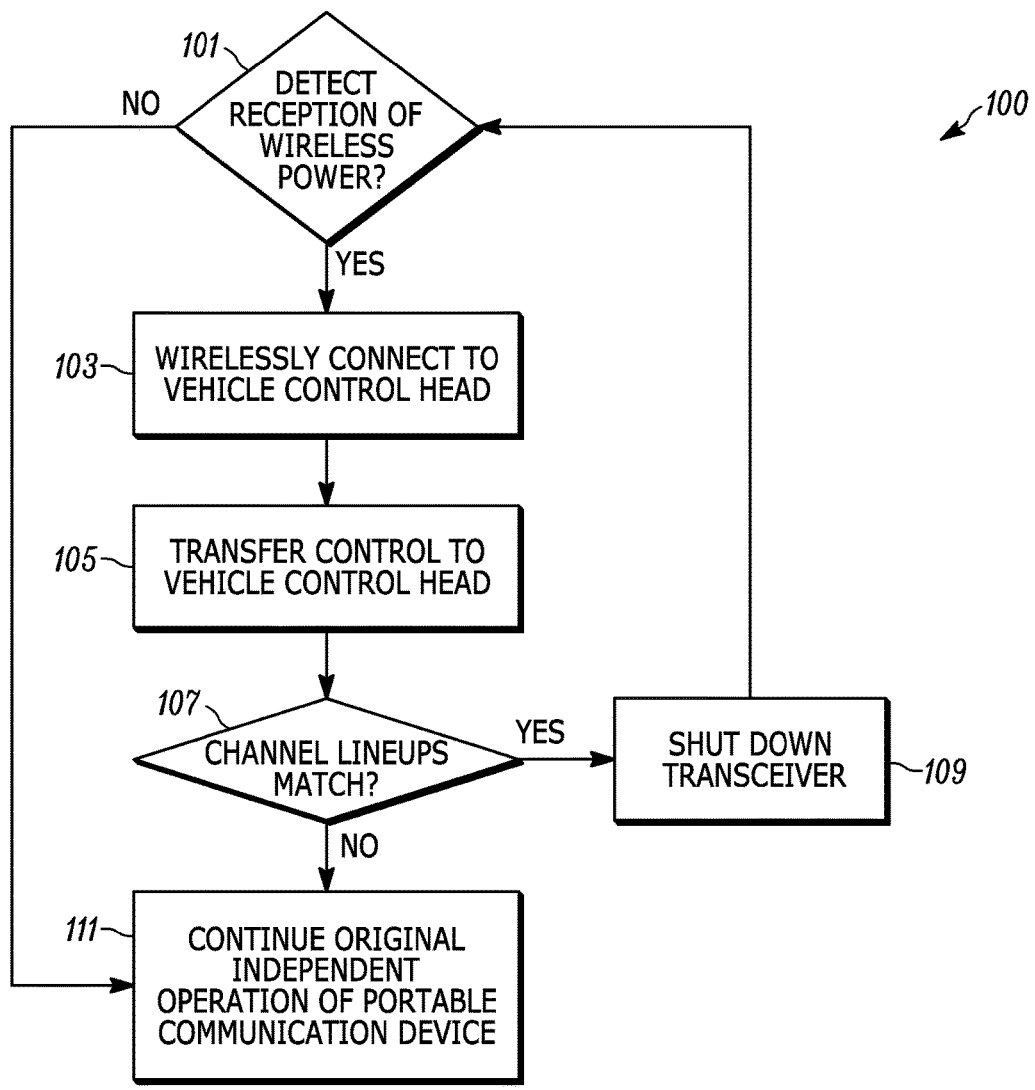
FIG. 4 is a flowchart of a method for transferring control between portable devices and a vehicle control head in accordance with some embodiments.

FIG. 4 is a flowchart of a method 100 for transferring control of the portable communication device 34 to the vehicle control head 20. As an example, the method 100 is described herein in terms of the portable communication device 34 being worn by the public safety officer 38. While outside of the vehicle 10, the portable communication device 34 is controlled via the input/output interface 54 of the portable communication device 34.

In one example, the public safety officer 38 enters the vehicle 10, the wireless charger 28 begins to wirelessly transfer power to the portable communication device 34. At block 101, the electronic processor 50 detects that the wireless power receiver 64 is receiving power wirelessly from the wireless charger 28. At block 103, the portable communication device 34 then establishes the short-range wireless connection 40 to the vehicle control head 20. At block 105, the portable communication device 34 sends a message to the vehicle control head 20, transferring control of the portable communication device 34 to the vehicle control head 20. The controls on the vehicle control head 20 may now be used to select channels or modes, originate voice and data communications, and otherwise control the operation of the portable communication device 34. Establishing the short-range wireless connection 40 after the electronic processor 50 detects the reception of wireless power helps to prevent the short-range wireless connection 40 being established while the portable communication device 34 is still outside the vehicle 10. In some embodiments, establishing the short-range wireless connection 40 requires an authentication token. In such embodiments, the electronic processor 50 enables the wireless security reader 66, and obtains the authentication token from the wireless security reader 66.

At block 107, the portable communication device 34 obtains the channel lineup for the mobile communication device 16 from the vehicle control head 20. The channel lineup is a listing of the radio channels programmed into the mobile communication device 16. The portable communication device 34 compares the channel lineup with its own channel lineup. When the channel lineups match, the portable communication device 34 shuts down its transceiver 58 at block 109, because the same communications channels available through the portable communication device 34 are available through the vehicle control head 20 on the mobile communication device 16. Shutting down the transceiver 58 reduces power consumption by the portable communication device 34 and prevents duplicative transmission and reception of radio communications. However, when the channel lineups do not match, then the portable communication device 34 will continue its original independent operation at block 111 so that communications on non-duplicated channels will not be missed.

The concepts just described with respect to the portable communication device 34 may also be applied to the audio accessory device 36 being worn by the public safety officer 38. While outside of the vehicle 10, the audio accessory device 36 and the portable communication device 34 are wirelessly coupled over the wireless control link 37. The portable communication device 34 is controllable from audio accessory device 36. When the public safety officer 38 enters the vehicle 10, the wireless charger 28 begins to wirelessly transfer power to the audio accessory device 36. At block 101, the audio accessory electronic processor 70 detects that the wireless power receiver 86 is receiving power wirelessly from the wireless charger 28. At block 103, the audio accessory device 36 then disconnects the wireless control link 37 and establishes the second short-range wireless connection 42 to the vehicle control head 20. At block 105, the audio accessory device 36 sends a message to the vehicle control head 20, indicating to the vehicle control head 20 that it is available. The audio accessory device 36 may now be used to input audio (via microphone 80) to the vehicle control head 20, or receive audio (via the speaker 82) from the vehicle control head 20. For example, the vehicle control head 20 may ordinarily broadcast audio from the vehicle speaker 22. If a radio call is received by the mobile communication device 16 while the vehicle speaker 22 is broadcasting another call, the audio portion of the new call is routed through the speaker 82 of the audio accessory device 36. As with the portable communication device 34, establishing the second short-range wireless connection 42 after the audio accessory electronic processor 70 detects the reception of wireless power helps to prevent the second short-range wireless connection 42 being established while the audio accessory device 36 is still outside the vehicle 10.

When the public safety officer 38 exits the vehicle 10, original independent operations resume. For the portable communication device 34, when the electronic processor 50 detects that the portable communication device 34 is no longer receiving wireless power, it sends a message to the vehicle control head 20, indicating that it is taking control back from the vehicle control head 20. The electronic processor 50 then terminates the short-range wireless connection 40, and control of the portable communication device 34 is transferred from the vehicle control head 20 to the portable communication device 34.

For the audio accessory device 36, when the audio accessory electronic processor 70 detects that the audio accessory device 36 is no longer receiving wireless power, it sends a message to the vehicle control head 20, indicating that it is taking control back from the vehicle control head 20. The audio accessory electronic processor 70 then terminates the second short-range wireless connection 42. Finally, the portable communication device 34 and the audio accessory device 36 reestablish the wireless control link 37.

Figure 5:
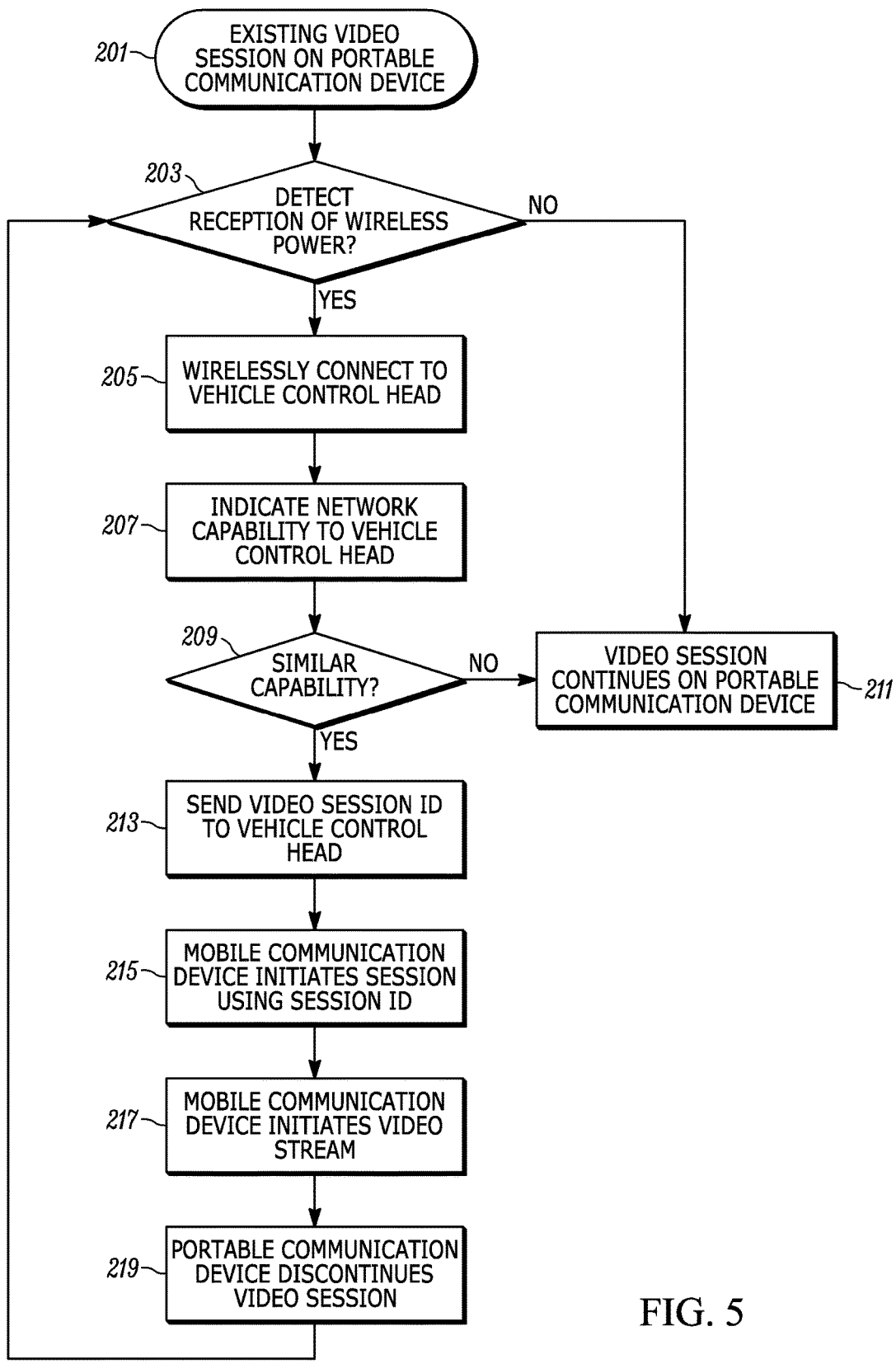
FIG. 5 is a flowchart of a method for transferring user sessions between mobile and portable devices in accordance with some embodiments.

FIG. 5 is a flowchart of a method 200 for transferring a video session (video stream, or video conference) between the portable communication device 34 and the mobile communication device 16. As an example, the method 200 is described herein in terms of the portable communication device 34 being a smart telephone, or another similar portable electronic device. While outside of the vehicle 10, the portable communication device 34 is wirelessly coupled to the wireless communications network 30 over the wireless link 35. At block 201, the portable communication device 34 receives an existing video session from the operations center 33. A video session is identified by a session identifier and includes of a stream of packets. Each packet has a packet identifier. The operations center 33 is capable of sending either the full video stream, or just the packet identifiers. The operations center 33 is thus able communicate information about the video stream to multiple devices without transmitting the entire video stream.

The portable communication device 34 is brought into the vehicle 10, and placed in inductive power transfer range of the wireless charger 28. The electronic processor 50 detects the reception of wireless power at block 203. At block 205, the portable communication device 34 establishes the short-range wireless connection 40 with the vehicle control head 20.

At block 207, the portable communication device 34 sends a message to the vehicle control head 20 indicating that it is receiving a video session and its network capabilities (e.g., Wi-Fi, LTE, etc.). At step 209, the vehicle control head 20 determines whether the communications system 12 has similar network capability to receive the video stream. When the communications system 12 has no capability to receive the video stream, then the portable communication device 34 will continue receiving the video session at block 211. When the communications system 12 does have the network capability to receive the video stream, it sends a message to the portable communication device 34 indicating that it is ready to take over the video session. The portable communication device 34 then sends the video session identifier and the last received packet identifier to the vehicle control head 20 at block 213. At block 215, the vehicle control head 20 sends the video session identifier and the last received packet identifier to the operations center 33, with a request to initiate the video session, but receives only the packet identifiers for the video stream. When the video session is established, the vehicle control head 20 sends a message to the operations center 33 requesting the full video stream, and sends an acknowledgement message to the portable communication device at block 217. Upon receiving the acknowledgement message, the portable communication device 34 discontinues its video session at block 219. The portable communication device 34 sends a request to the operations center 33 to receive only the packet identifiers for the video session. This allows the two devices to stay in sync, but saves on network bandwidth, as only one live stream is sent.

When the electronic processor 50 detects that the portable communication device is no longer receiving wireless power, it will send a request to the vehicle control head 20 for the last packet identifier received, and a request to the operations center 33 to begin receiving the live video stream again, based on the last packet received by the vehicle control head 20. The video session is thus transferred from the vehicle control head 20 to the portable communication device 34.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for detecting the presence of a portable communication device in a vehicle, the method comprising:
    detecting, with an electronic processor of the portable communication device, that the portable communication device is receiving wireless power from a wireless charger located in the vehicle;
    establishing a short-range wireless connection between the portable communication device and a vehicle control head; and
    sending a message from the portable communication device to the vehicle control head to transfer control of the portable communication device to the vehicle control head, such that controls of the vehicle control head may be used to select one of a channel and a mode of the portable communication device.

2. The method of claim 1, further comprising:
    not establishing the short-range wireless connection between the portable communication device and the vehicle control head when the electronic processor of the portable communication device determines that the portable communication device is not receiving wireless power from the wireless charger.

3. The method of claim 1, further comprising:
    enabling, with the electronic processor, a wireless security reader; and
    obtaining, with the wireless security reader, an authentication token; and
    wherein establishing the short-range wireless connection includes sending the authentication token to the vehicle control head.

4. The method of claim 1, further comprising:
    obtaining a channel lineup from the vehicle control head via the short-range wireless connection; and
    shutting down a transceiver of the portable communication device when the channel lineup matches a second channel lineup of the portable communication device.

5. The method of claim 1, further comprising:
    detecting, with an audio accessory electronic processor of an audio accessory device, that the audio accessory device is receiving wireless power from the wireless charger located in the vehicle;
    establishing a second short-range wireless connection between the audio accessory device and the vehicle control head;
    terminating a wireless control link from the audio accessory device to the portable communication device; and
    sending a second message from the audio accessory device to the vehicle control head to transfer control of the audio accessory device to the vehicle control head.

6. The method of claim 5, further comprising playing, by the vehicle control head, an audio portion of a call on a speaker of the audio accessory device.

7. The method of claim 1, further comprising:
    detecting, with the electronic processor of the portable communication device, that the portable communication device is no longer receiving wireless power from the wireless charger;
    sending a second message from the portable communication device to the vehicle control head to return control of the portable communication device from the vehicle control head to the portable communication device; and
    terminating the second short-range wireless connection.

8. The method of claim 5, further comprising:
    detecting, with the audio accessory electronic processor, that the audio accessory device is no longer receiving wireless power from the wireless charger;
    sending a third message from the audio accessory device to the vehicle control head to return control of the audio accessory device to the audio accessory device;
    establish the wireless control link from the audio accessory device to the portable communication device; and
    terminating the short-range wireless connection between the audio accessory device and the vehicle control head.

9. The method of claim 1, further comprising
    sending a video session identifier for a first video session from the portable communication device to the vehicle control head;
    establishing a second video session, based on the video session identifier and a last retrieved packet identifier, on the vehicle control head;
    sending an acknowledgement message from the vehicle control head to the portable communication device when the second video session is established; and
    sending a request, with the portable communication device, to terminate the first video session.

10. A system for detecting the presence of a portable communication device in a vehicle, the system comprising:
    a vehicle control head located in the vehicle;
    a wireless charger located in the vehicle;
    a portable communication device including
        a transceiver; and
        an electronic processor configured to
            detect that the portable communication device is receiving wireless power from the wireless charger,
            establish a short-range wireless connection with the vehicle control head via the transceiver; and
            send a message to the vehicle control head to transfer control of the portable communication device to the vehicle control head, such that controls of the vehicle control head may be used to select one of a channel and a mode of the portable communication device.

11. The system of claim 10, wherein the audio accessory electronic processor is further configured to
    not establish the second short-range wireless connection with the vehicle control head via the transceiver when the audio accessory device is not receiving wireless power from the wireless charger.

12. The system of claim 10, wherein the portable communication device further includes a wireless security reader; and wherein the electronic processor is further configured to
    enable the wireless security reader;
    obtain, from the wireless security reader, a authentication token; and
    send the authentication token to the vehicle control head via the transceiver.

13. The system of claim 10, further comprising a mobile communication device coupled to the vehicle control head;
    wherein the electronic processor of the portable communication device is further configured to obtain a channel lineup for the mobile communication device from the vehicle control head via the short-range wireless connection;

shut down the transceiver when the channel lineup matches a second channel lineup of the portable communication device.

14. The system of claim 10, further comprising an audio accessory device coupled to the portable communication device via a wireless control link, the audio accessory device including an audio accessory transceiver, and an electronic audio accessory processor configured to detect that the audio accessory device is receiving wireless power from the wireless charger;

terminate the wireless control link;

establish a second short-range wireless connection with the vehicle control head via the audio accessory transceiver; and send a second message to the vehicle control head to transfer control of the audio accessory device to the vehicle control head.

15. The system of claim 14, further comprising a speaker of the audio accessory device;

wherein the electronic audio accessory processor is further configured to receive an audio portion of a call from the vehicle control head via the second short-range wireless connection; and play the audio portion of the call via the speaker.

16. The system of claim 10, wherein the electronic processor of the portable communication device is further configured to detect that the portable communication device is no longer receiving wireless power from the wireless charger;

send a second message to the vehicle control head to return control of the portable communication device from the vehicle control head to the portable communication device; and terminate the short-range wireless connection to the vehicle control head.

17. The system of claim 14, wherein the audio accessory electronic processor is further configured to detect that the audio accessory device is no longer receiving wireless power from the wireless charger;

send a third message from to the vehicle control head to return control of the audio accessory device to the audio accessory device;

establish the wireless control link to the portable communication device; and terminate the second short-range wireless connection.

18. The system of claim 10, wherein the vehicle control head is configured to receive a video session identifier for a first video session from the portable communication device;

establish a second video session, based on the video session identifier and a last retrieved packet identifier;

send an acknowledgement message to the portable communication device when the second video session is established; and wherein the electronic processor of the portable communication device is further configured to send a request to terminate the first video session.

* * * * *